(12) United States Patent
Unser et al.

(10) Patent No.: US 10,445,838 B2
(45) Date of Patent: Oct. 15, 2019

(54) AUTOMATIC DETERMINATION OF PERIODIC PAYMENTS BASED ON TRANSACTION INFORMATION

(71) Applicant: MasterCard International Incorporated, Purchase, NY (US)

(72) Inventors: Kenny Unser, Fairfield, CT (US); Serge Bernard, Danbury, CT (US); Nikhil Malgatti, Stamford, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 544 days.

(21) Appl. No.: 14/098,829

(22) Filed: Dec. 6, 2013

(65) Prior Publication Data
US 2015/0161741 A1    Jun. 11, 2015

(51) Int. Cl.
*G06Q 40/00* (2012.01)
*G06Q 20/12* (2012.01)
*G06N 20/00* (2019.01)

(52) U.S. Cl.
CPC ............ *G06Q 40/12* (2013.12); *G06Q 20/12* (2013.01); *G06N 20/00* (2019.01)

(58) Field of Classification Search
USPC .......................................... 705/36 R, 37, 34
See application file for complete search history.

(56) References Cited

U.S. PATENT DOCUMENTS

| 7,693,771 B1 * | 4/2010 | Zimmerman | G06Q 40/00 705/36 R |
| 2009/0307075 A1 | 12/2009 | Maw | |
| 2013/0173320 A1 | 7/2013 | Bank et al. | |
| 2013/0325681 A1 | 12/2013 | Somashekar et al. | |
| 2013/0325703 A1 * | 12/2013 | Kingsley | G06Q 20/22 705/39 |
| 2014/0067533 A1 * | 3/2014 | Gandhi | G06Q 30/02 705/14.53 |

* cited by examiner

*Primary Examiner* — Fahd A Obeid
*Assistant Examiner* — Reva R Danzig
(74) *Attorney, Agent, or Firm* — Buckley, Maschoff & Talwalkar LLC

(57) ABSTRACT

According to some embodiments, transaction information associated with payments made via a payment account may be retrieved from a transaction database. The retrieved transaction information may then be analyzed to automatically determine periodic payment information (e.g., associated with a subscription or membership) associated with the payment account. The automatically determined periodic payment information may then be output. For example, a predicted next periodic payment due date might be calculated and output.

20 Claims, 11 Drawing Sheets

| ACCOUNT AND TRANSACTION IDENTIFIERS 402 | MERCHANT IDENTIFIER 404 | DATE AND TIME 406 | AMOUNT 408 | DESCRIPTION 410 |
|---|---|---|---|---|
| A_1001 T_12131 | M_101 | 07/04/2015 08:38 | $950.53 | INSURANCE |
| A_1001 T_26772 | M_439 | 07/10/2015 14:33 | $34.15 | MAGAZINE |
| A_1001 T_37863 | M_101 | 07/15/2016 06:12 | $967.80 | INSURANCE |
| A_1001 T_48756 | M_101 | 07/10/2017 11:57 | $978.43 | INSURANCE |

| MERCHANT IDENTIFIER 502 | MERCHANT DESCRIPTION 504 |
|---|---|
| M_101 | INSURANCE |
| M_102 | FITNESS CLUB |
| M_103 | MAGAZINE SALE |
| M_104 | INSURANCE |

FIG. 5

| ACCOUNT IDENTIFIER 602 | PERIODIC PAYMENT INFORMATION 604 | PREDICTED NEXT PERIODIC PAYMENT DUE DATE 606 |
|---|---|---|
| A_1001 | YEARLY (INSURANCE) | 7/1/2016 |
| A_1001 | QUARTERLY (FITNESS CLUB) | 3/31/2016 |
| A_1001 | YEARLY (MAGAZINE) | 1/1/2017 |
| A_1002 | YEARLY (AAA MEMBERSHIP) | 10/15/2016 |

AUTOMATIC DETERMINATION OF PERIODIC PAYMENTS BASED ON TRANSACTION INFORMATION

BACKGROUND

Information about periodic payments associated with a person may be of interest to various entities. For example, an insurance company might want to know when a person is going to make his or her next yearly automobile or home owner's insurance payment (e.g., so that the insurance company can provide the person with an insurance offer at an appropriate time). Similarly, a fitness club might want to know which residents in a particular city have memberships at other clubs that are going to expire in the next three months. Attempting to manually determine periodic payment information for a group of people, such as by conducting a telephone or online survey, can be an expensive, time-consuming, and error prone task, especially when a substantial number of people are involved. As a result, systems and methods to automatically determine periodic payment information may be desired.

BRIEF DESCRIPTION OF THE DRAWINGS

FIG. 5 is a tabular portion of a merchant database in accordance with some embodiments.

DETAILED DESCRIPTION

Figure 1:
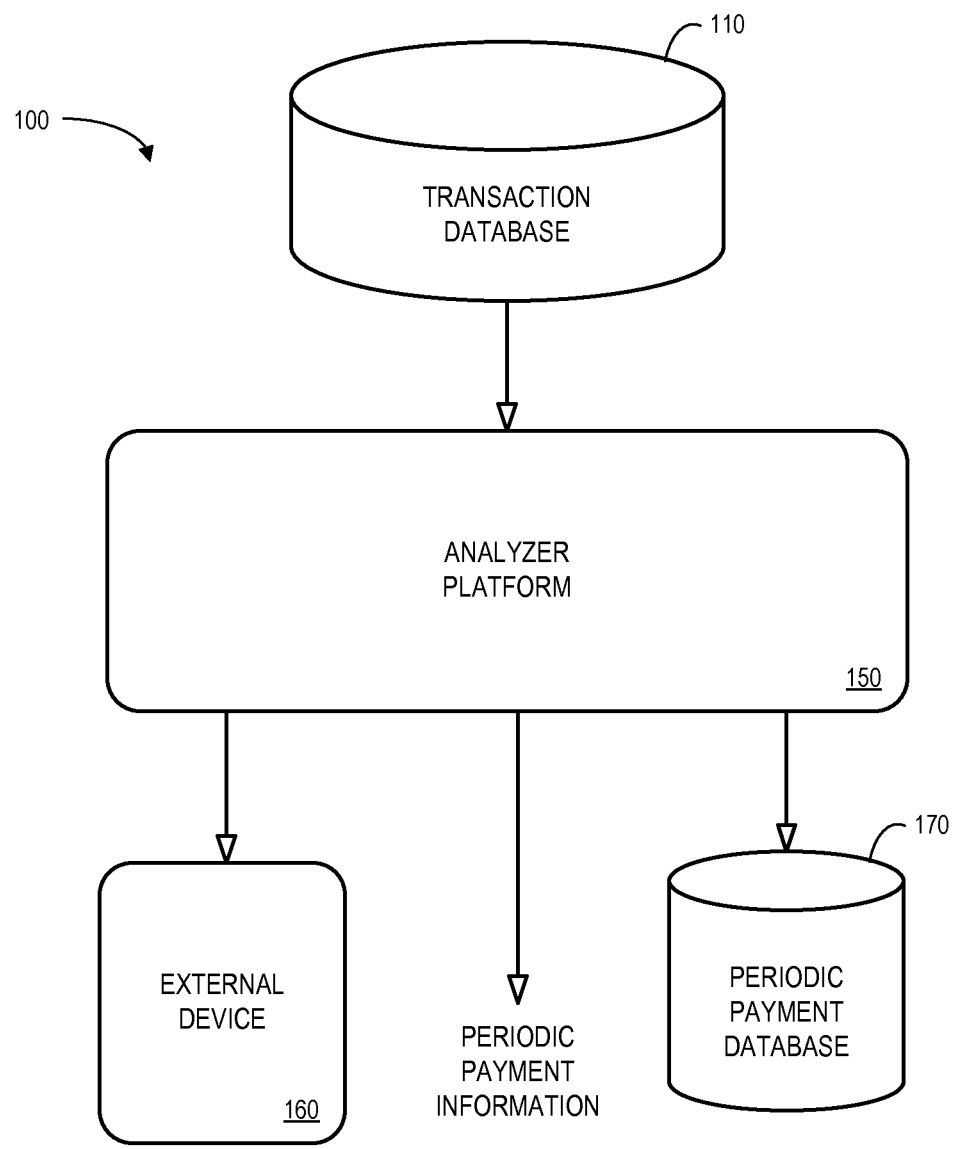
FIG. 1 is a block diagram overview of a system according to some embodiments of the present invention.

Information about periodic payments associated with a person or business may be of interest to various entities. For example, an advertiser might want to know when a person is going to pay dues to renew his or her membership in an organization (e.g., so that the advertiser can provide the person with a membership offer at an appropriate time). Similarly, a company that collects commissions on magazine subscription renewals might want to know which residents in a particular ZIP code have magazine subscriptions that are about to expire in the next 30 days. Attempting to manually determine periodic payment information for a group of people, such as by conducting a telephone or online survey, can be an expensive, time-consuming, and error prone task, especially when a substantial number of people are involved. It would therefore be desirable to provide accurate and efficient systems and methods to automatically determine periodic payment information. FIG. 1 is block diagram of a system 100 according to some embodiments of the present invention. In particular, the system 100 includes an analyzer platform 150 that receives information from a transaction database 110 and outputs periodic payment information, such as by outputting the periodic payment information to an external device 160 and/or a periodic payment information database 170.

The analyzer platform 150 might be, for example, associated with a Personal Computer (PC), laptop computer, an enterprise server, a server farm, and/or a database or similar storage devices. The analyzer platform 150 may, according to some embodiments, be associated with a credit card company.

According to some embodiments, an "automated" analyzer platform 150 may facilitate the determination of periodic payment information. For example, the analyzer platform 150 may automatically output a list of people who are about to renew their membership in a roadside assistance program. As used herein, the term "automated" may refer to, for example, actions that can be performed with little (or no) intervention by a human.

As used herein, devices, including those associated with the analyzer platform 150 and any other device described herein, may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

The analyzer platform 150 may retrieve transaction information from the transaction database 110. The transaction database 110 might be associated with, for example, payment accounts, such as credit card or bank accounts. The transaction database 110 may be locally stored or reside remote from the analyzer platform 150. As will be described further below, the transaction database 110 may be used by the analyzer platform 150 to generate periodic payment information. According to some embodiments, the analyzer platform 150 communicates periodic payment information to an external device 160, such as by transmitting an electronic file to an email server, a workflow management system, etc. In other embodiments, the analyzer platform 150 might store periodic payment information in a periodic payment information database 170.

Although a single analyzer platform 150 is shown in FIG. 1, any number of such devices may be included. Moreover, various devices described herein might be combined according to embodiments of the present invention. For example, in some embodiments, the analyzer platform 150 and transaction database 110 might be co-located and/or may comprise a single apparatus.

In accordance with some embodiments, the systems and methods described herein provide a framework to determine periodic payment information based on transaction information associated with payment accounts. For example, a payment card may presented by a cardholder (e.g., the account owner) to make a payment. By way of example, and without limiting the generality of the foregoing, a payment card can be a credit card, debit card, charge card, stored-value card, or prepaid card or nearly any other type of financial transaction card. Further, as used herein in, the term "issuer" or "attribute provider" can include, for example, a financial institution (i.e., bank) issuing a card, a merchant issuing a merchant specific card, a stand-in processor configured to act on-behalf of the card-issuer, or any other suitable institution configured to issue a payment card. As used herein, the term "transaction" can be associated with, for example, a merchant, a merchant terminal, an automated teller machine (ATM), or any other suitable institution or device configured to initiate a financial transaction per the request of the account owner.

The information in the transaction database 110 may be associated with, for example, a "payment card processing system" or "credit card processing networks", such as the MasterCard® network that allows account owners to use payment cards issued by a variety of issuers to shop at a variety of merchants. With this type of payment card, a card issuer or attribute provider, such as a bank, extends credit to an account owner to purchase products or services. When an account owner makes a purchase from an approved merchant, the card number and amount of the purchase, along with other relevant information, are transmitted via the processing network to a processing center, which verifies that the card has not been reported lost or stolen and that the card's credit limit has not been exceeded. In some cases, the account owner's signature is also verified, a personal identification number is required or other user authentication mechanisms are imposed. The account owner is required to repay the bank for the purchases, generally on a monthly basis.

The transaction database 110 may further store a "business classification," which is a group of merchants and/or businesses, by the type of goods and/or service the merchant and/or business provides. For example, the group of merchants and/or businesses can include merchants and/or business, which provide similar goods and/or services. In addition, the merchants and/or businesses can be classified based on geographical location, sales, and any other type of classification, which can be used to associate a merchant and/or business with similar goods, services, locations, economic and/or business sector, industry and/or industry group.

The transaction database 110 may also store a "merchant category code" or "MCC," which is a four-digit number created by MasterCard® or VISA® and assigned to a business by the acquirer when the business first starts accepting one of these cards as a form of payment. The MCC is used to classify the business by the type of goods or services it provides. For example, in the United States, the merchant category code can be used to determine if a payment needs to be reported to the IRS for tax purposes. In addition, Merchant Category Codes (or "MCCs") are used by card issuers to categorize, track or restrict certain types of purchases.

In accordance with some embodiments, data associated with payment card transactions is stored within the transaction database 110. The data may include, for example, a listing of sales amount for each payment card transaction including the type of goods and/or services sold, a total number of goods and/or services sold in each transaction, a total sales amount for each transaction (e.g., gross dollar amount). In addition, for each merchant and/or business, the data associated with each transaction may include a point-of-sale or point-of-purchase (e.g., location of each payment card transaction). The point-of-sale or point-of-purchase provides that for merchants and/or businesses having one or more locations, the location of the merchant and/or business, which generated the sale can be identified.

Figure 2:
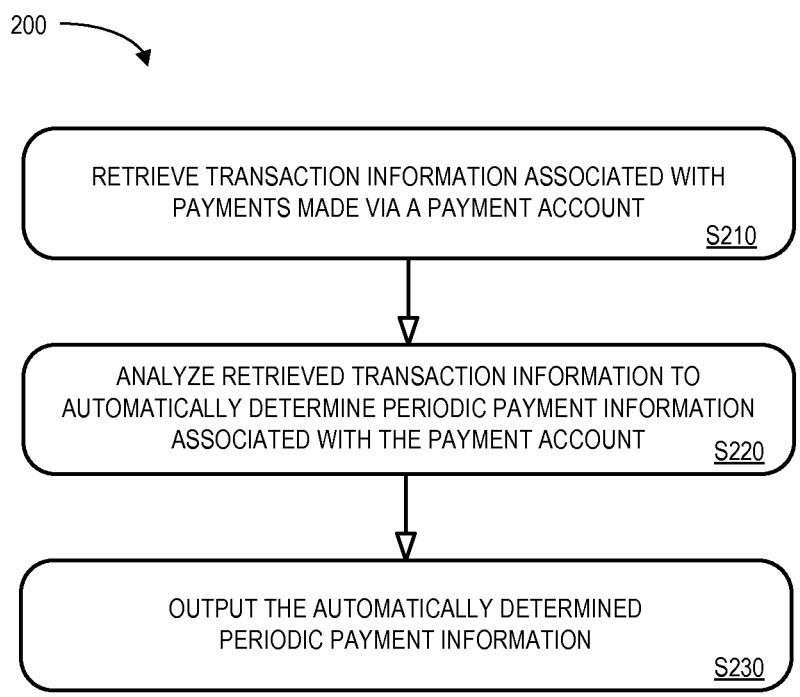
FIG. 2 illustrates a method that might be performed in accordance with some embodiments.

FIG. 2 illustrates a method that might be performed by some or all of the elements of the system 100 described with respect to FIG. 1 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, transaction information associated with payments made via a payment account, associated with an account owner, may be retrieved from a transaction database. The payment account may be associated, for example, a credit card account, a debit card account, a bank account, a pre-paid card account, or any other type of payment account. The transaction information may include, for example, an account identifier, a merchant identifier, a date, a time of day, a payment amount, a payment description, or any other type of transaction information.

At S220, the retrieved transaction information may be analyzed to automatically determine "periodic payment" information associated with the account owner. As used herein, the term "periodic payment" might refer to, for example, a recurring payment that occurs on a year basis, quarterly basis, etc. Moreover, the phrase "periodic payment information" may include a merchant classification, a predicted next payment due date, or any other type of periodic payment information. At S230, the automatically determined periodic payment information may be output. For example, the periodic payment information might be displayed on a computer monitor, transmitted in a computer file, and/or stored in a database.

Figure 3:
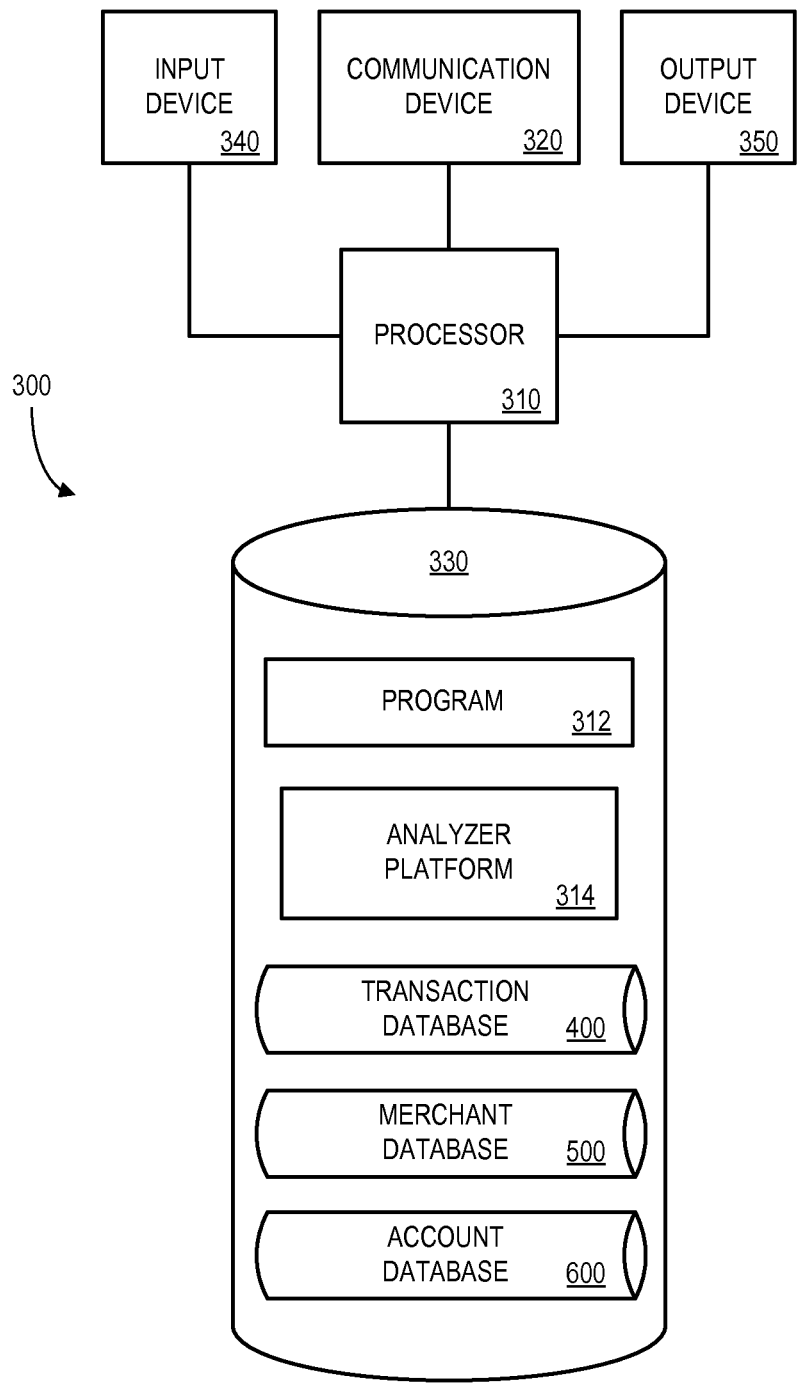
FIG. 3 is block diagram of an analyzer tool or platform according to some embodiments of the present invention.

In this way, transaction information may be analyzed to automatically determine periodic payment information. Note that the embodiments described herein may be implemented using any number of different hardware configurations. For example, FIG. 3 illustrates an analyzer platform 300 that may be, for example, associated with the system 100 of FIG. 1. The analyzer platform 300 comprises a processor 310, such as one or more commercially available Central Processing Units (CPUs) in the form of one-chip microprocessors, coupled to a communication device 320 configured to communicate via a communication network (not shown in FIG. 3). The communication device 320 may be used to communicate, for example, with one or more transaction databases. The analyzer platform 300 further includes an input device 340 (e.g., a computer mouse and/or keyboard to enter information about periodic payment filters or windows) and an output device 350 (e.g., a computer monitor or printer to output a periodic payment information report).

The processor 310 also communicates with a storage device 330. The storage device 330 may comprise any appropriate information storage device, including combinations of magnetic storage devices (e.g., a hard disk drive), optical storage devices, mobile telephones, and/or semiconductor memory devices. The storage device 330 stores a program 312 and/or analyzer platform logic 314 for controlling the processor 310. The processor 310 performs instructions of the programs 312, 314, and thereby operates in accordance with any of the embodiments described herein. For example, the processor 310 may retrieve transaction information associated with payments made via a payment account (e.g., a credit card account), associated with an account owner, from a transaction database. The retrieved transaction information may then be analyzed by the processor 310 to automatically determine periodic payment information associated with the account or account owner. For example, yearly insurance payments might be automatically located by the processor 310.

The programs 312, 314 may be stored in a compressed, uncompiled and/or encrypted format. The programs 312, 314 may furthermore include other program elements, such as an operating system, a database management system, and/or device drivers used by the processor 310 to interface with peripheral devices.

As used herein, information may be "received" by or "transmitted" to, for example: (i) the analyzer platform 300 from another device; or (ii) a software application or module within the analyzer platform 300 from another software application, module, or any other source.

In some embodiments (such as shown in FIG. 3), the storage device 330 further stores a transaction database 400, a merchant database 500, and an account database 600. Some examples of databases that may be used in connection with the analyzer platform 300 will now be described in detail with respect to FIGS. 4 through 6. Note that the databases described herein are only examples, and additional and/or different information may actually be stored therein. Moreover, various databases might be split or combined in accordance with any of the embodiments described herein. For example, the account database 600 and demographic database 360 might be combined and/or linked to each other within the analyzer platform 300.

Figure 4:
FIG. 4 is a tabular portion of a transaction database according to some embodiments.

Referring to FIG. 4, a table is shown that represents the transaction database 400 that may be stored at the analyzer platform 300 according to some embodiments. The table may include, for example, entries identifying transactions that have been processed via a payment account (e.g., credit card transactions). The table may also define fields 402, 404, 406, 408, 410 for each of the entries. The fields 402, 404, 406, 408, 410 may, according to some embodiments, specify: account and transaction identifiers 402, a merchant identifier 404, a date and time 406, an amount 408, and a description 410. The transaction database 400 may be created and updated, for example, based on information electrically received on a periodic basis.

The account identifier 402 may be, for example, a unique alphanumeric code identifying a payment account, such as a Primary Account Number ("PAN"). The transaction identifier 402 may be associated with a particular transaction (e.g., a purchase from a magazine clearinghouse). The date and time 406 may indicate when the transaction occurred, and the amount 408 may indicate the monetary amount of the transaction. The description may indicate what was purchased in the transaction (e.g., a general indication that a credit card was used at a fitness club, a type of goods or services typically offered by the merchant, etc.).

Referring to FIG. 5, a table is shown that represents the merchant database 500 that may be stored at the analyzer platform 300 according to some embodiments. The table may include, for example, entries identifying merchants involved in the transactions. The table may also define fields 502, 504 for each of the entries. The fields 502, 504 may, according to some embodiments, specify: a merchant identifier 502 and a merchant description 504. The merchant database 500 may be created and updated, for example, based on information electrically received on a periodic basis.

The merchant identifier 502 may be, for example, a unique alphanumeric code identifying a merchant and may, or may not, be associated with the merchant identifier 404 in the transaction database 400. The merchant description 504 may be associated with, for example, an MCC or other data indicating the type of goods and/or services offered by the merchant.

Figure 6:
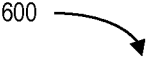
FIG. 6 is a tabular portion of an account database according to some embodiments.

Referring to FIG. 6, a table is shown that represents the account database 600 that may be stored at the analyzer platform 300 according to some embodiments. The table may include, for example, entries identifying one or more payment accounts associated with the transactions. The table may also define fields 602, 604, 606 for each of the entries. The fields 602, 604, 606 may, according to some embodiments, specify: an account identifier 602, periodic payment information 604, and a predicted next periodic payment due date 606. The account database 600 may be created and updated, for example, automatically by an analyzer platform based on transaction data.

The account identifier 602 may be, for example, a unique alphanumeric code identifying a payment account and may, or may not, be associated with the account identifier 402 in the transaction database 400. The periodic payment information 604 may, for example, indicate the period between payments (e.g., yearly or quarterly payments). The predicted next periodic due date 606 may, for example, indicate when the next payment by the payment account owner is expected to occur.

Figure 7:
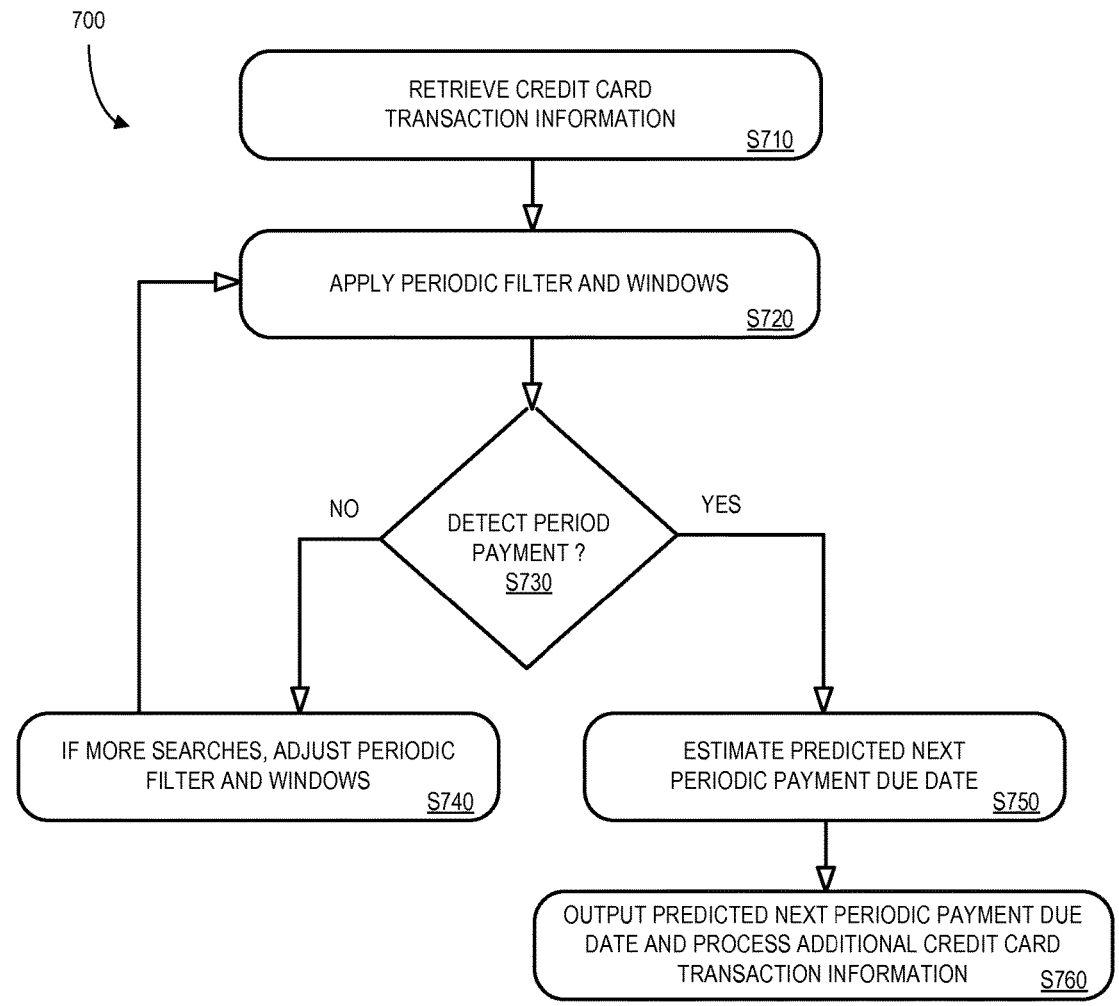
FIG. 7 illustrates a periodic payment search method that might be performed in accordance with some embodiments.

Note that systems and methods may attempt to identify periodic payments in any number of different ways. FIG. 7 illustrates a periodic payment information method that might be performed in accordance with some embodiments. Note, however, that embodiments described herein might use any other way to detect and/or search for periodic payment patterns. At S710, credit card transaction information may be retrieved (e.g., from a credit card transaction database). At S720, a periodic filter and windows may be applied to the retrieved credit card transaction information.

Figure 8:
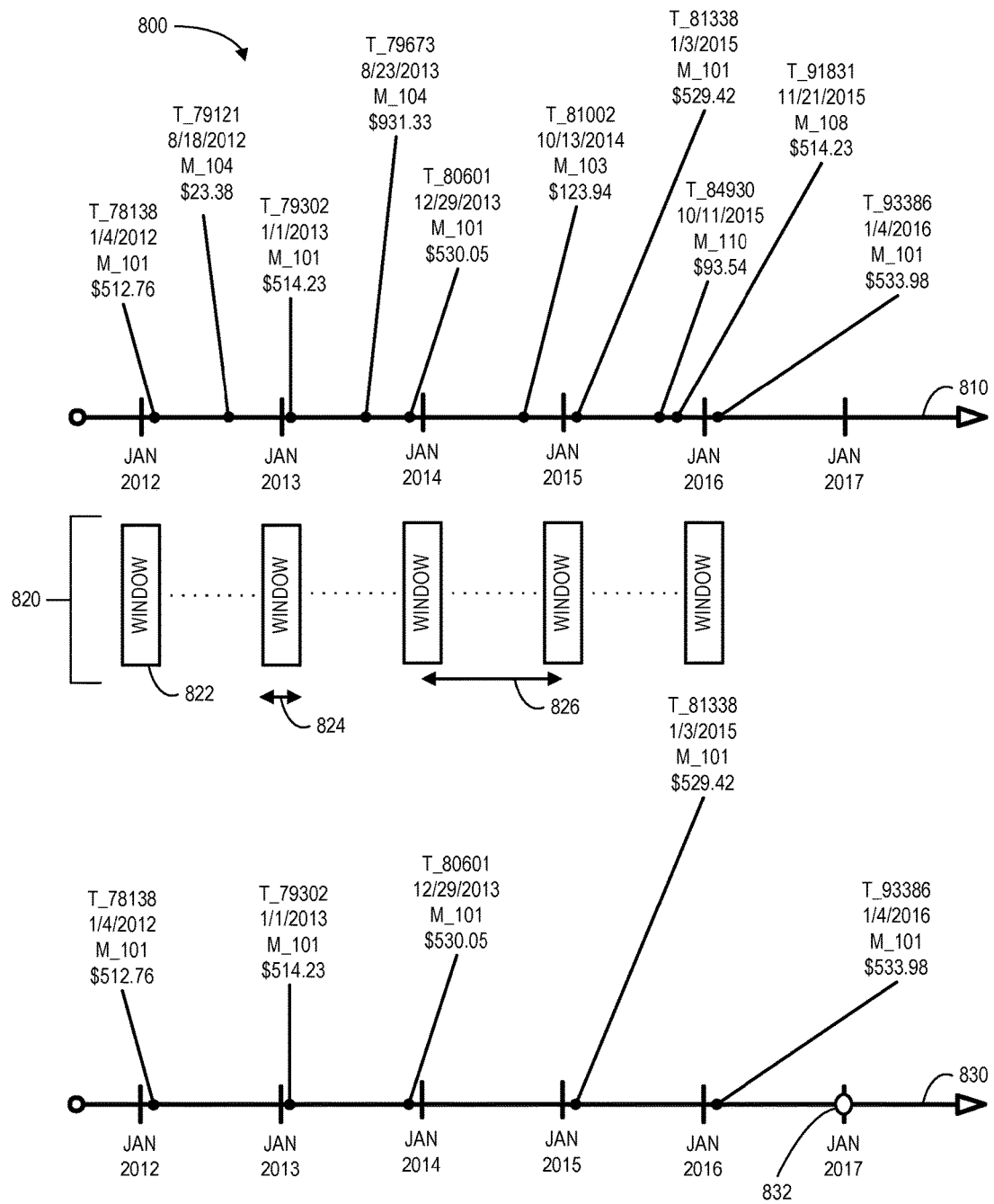
FIG. 8 illustrates a predicted periodic payment example associated with some embodiments.

Consider, for example, FIG. 8 which illustrates a predicted periodic payment example 800 associated with some embodiments. The example includes a first timeline 810 of credit card transactions. According to some embodiments, an analyzer platform may search through the first timeline 810 looking for credit card transactions that fit a periodic payment pattern. For example, a periodic payment filter 820 comprising a number of payment windows 822 may be applied to the first timeline to filter out transactions that do not occur within those windows 822. In this example, each window 822 has a width 824 (e.g., two weeks) and adjacent windows 822 are separated by a period 826 (e.g., one year). A second timeline 830 indicates the result of applying the periodic payment filter 820 to the first timeline 810. If may now be easier for the analyzer platform detect that the credit card is used to make yearly payments, of approximately the same monetary amount, to merchant "M_101" near January $1^{st}$ of each year. This information might be used, for example, to calculate a predicted next periodic payment due date 832 (e.g., Jan. 1, 2017).

Note that the periodic payment filter 820 might be adjusted and re-applied to the first timeline 810. For example, the windows 822 might "slide" to different locations (e.g., to detect periodic payments that occur in July of each year), the width 824 of the windows 822 might be altered (e.g., to make detection more or less sensitive), and/or the period 826 between windows 822 could be changed (e.g., to now search for quarterly payments).

Note that embodiments described herein may generate periodic payment information associated with an account owner, an account owner's household, and/or an account owner's business. For example, a husband and wife may each be associated with a separate payment account, and an analyzer platform may realize these accounts are linked (e.g., and merge the two accounts when searching for periodic payment patterns). Moreover, the specific rules and logic of FIGS. 7 and 8 are provided only as one example, and embodiments might search for periodic payments in any number of different ways.

Figure 9:
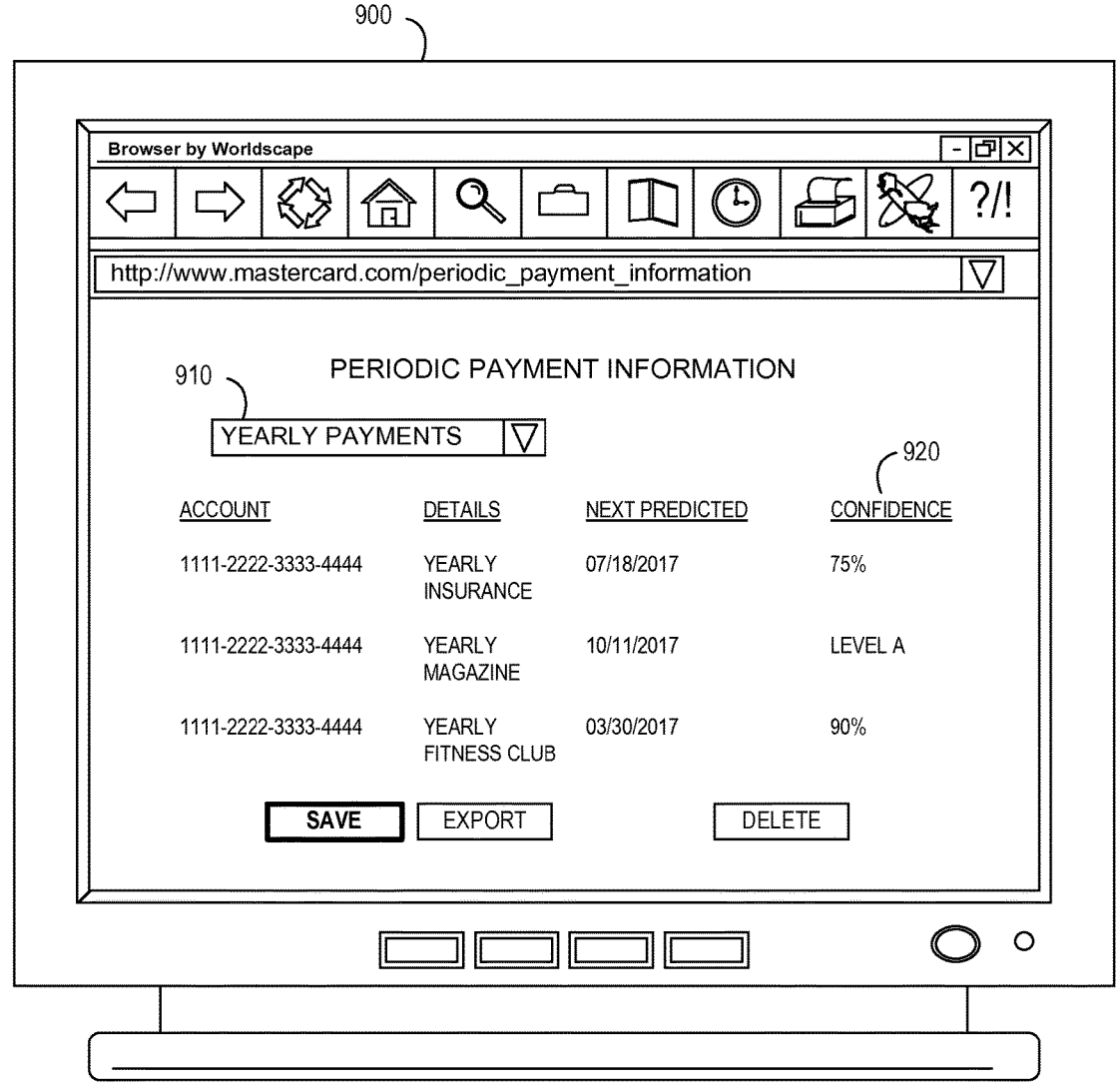
FIG. 9 is an example of a display that might be provided in accordance with some embodiments.

FIG. 9 is an example of a display 900 that might be provided in accordance with some embodiments. In particular, a user might select 910 which type of periodic payment information should be included on the display (e.g., all payment account owners who are residents of California, all account owners who are under 35 years old, all yearly periodic payments, etc.). Moreover, as illustrated in FIG. 9, an analyzer platform may generate and display a "confidence level" associated with the periodic payment information. The confidence level might indicate, for example, how likely it is that estimated or predicted periodic payment information is actually correct (e.g., by a percentage likelihood or a confidence category).

Figure 10:
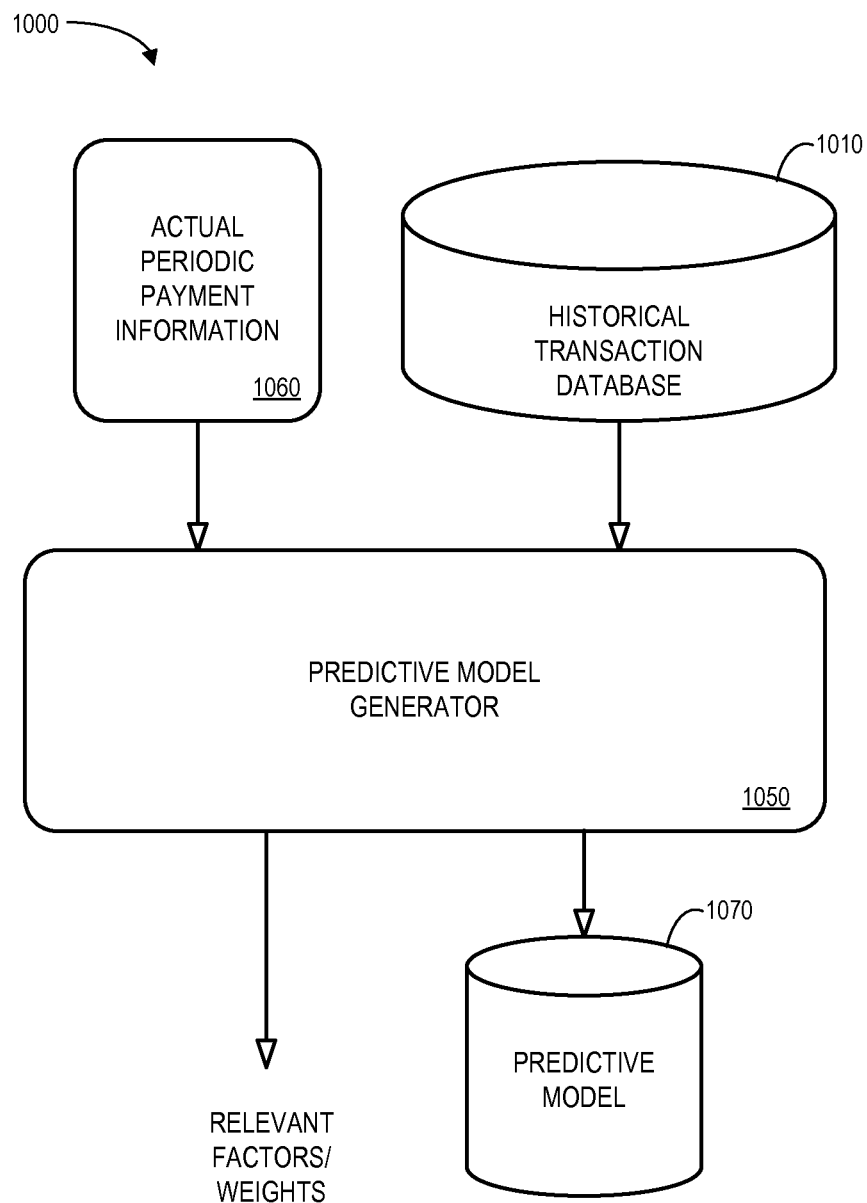
FIG. 10 is a block diagram of a system including a predictive model generator according to some embodiments.

Note that rules and logic described with respect to FIGS. 7 and 8 might be manually designed and constructed by a human operator. In some cases, however, relevant factors in a transaction database may be automatically identified and/or used to create a predictive model. For example, FIG. 10 is a block diagram of a system 1000 including a predictive model generator 1050 according to some embodiments. The predictive model generator 1050 may receive actual periodic payment information 1060 along with historical transaction database 1010 information. For example, historical credit card purchases may be received along with indications of the actual periodic payment associated with those accounts (e.g., from a survey or Department of Motor Vehicles insurance database).

The predictive model generator 1050 may look for patterns in the historical transaction information to identify relevant factors and/or associated weights. For example, account owners who have transactions with a magazine clearing store might be identified as being highly likely to make periodic payments.

Figure 11:
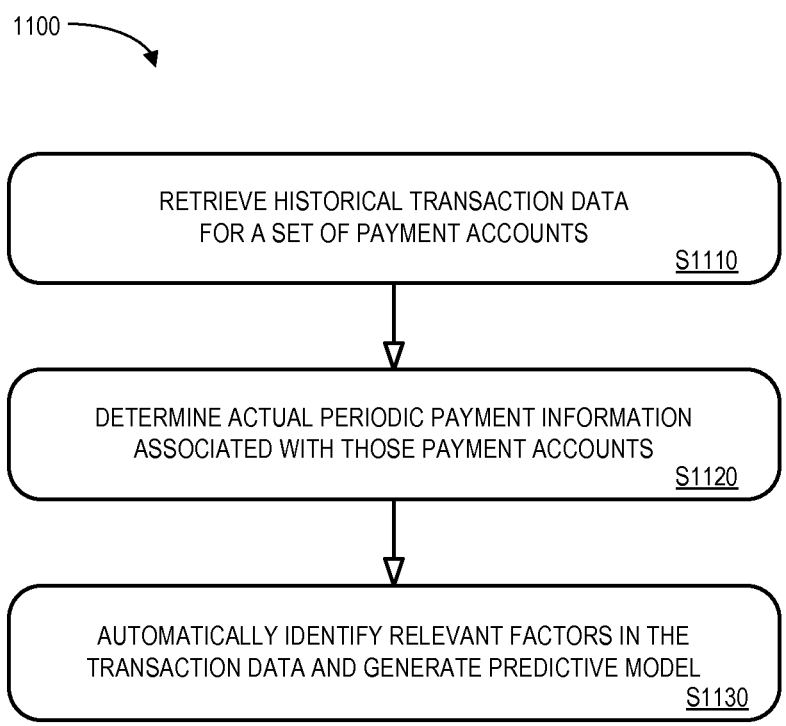
FIG. 11 is a flow chart illustrating how a predictive model might be generated according to some embodiments.

FIG. 11 is a flow chart illustrating how a predictive model might be generated according to some embodiments. At S1110, historical transaction data is retrieved from a set of payment accounts. Actual periodic payment information associated with those payment accounts is determined at S1120. The relevant factors in the historical transaction data may be automatically identified at S1130 and a predictive model may be automatically generated.

Thus, according to some embodiments, periodic payment information may be based at least in part on rules created by a predictive model trained with historical transaction information. According to some embodiments, a predictive model utilizes different groupings associated with different sets and/or weights of relevant factors. For example, depending on high level grouping, different variables may be significant and/or relevant and the weightings of common variables may be different.

In general, and for the purposes of introducing concepts of embodiments of the present invention, a computer system may incorporate a "predictive model." As used herein, the phrase "predictive model" might refer to, for example, any of a class of algorithms that are used to understand relative factors contributing to an outcome, estimate unknown outcomes, discover trends, and/or make other estimations based on a data set of factors collected across prior trials. Note that a predictive model might refer to, but is not limited to, methods such as ordinary least squares regression, logistic regression, decision trees, neural networks, generalized linear models, and/or Bayesian models. The predictive model is trained with historical transaction information, and may be applied to current or test transactions to determine periodic payment information.

The predictive model generator 1050 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein. The predictive model generator 1050, in various implementation, may include one or more of neural networks, Bayesian networks (such as Hidden Markov models), expert systems, decision trees, collections of decision trees, support vector machines, or other systems known in the art for addressing problems with large numbers of variables. According to some embodiments, the predictive model(s) are trained on prior data and periodic payment types known to the credit card company. The specific data and outcomes analyzed may vary depending on the desired functionality of the particular predictive model. The particular data parameters selected for analysis in the training process may be determined by using regression analysis and/or other statistical techniques known in the art for identifying relevant variables in multivariable systems.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method, comprising:
retrieving, from a transaction database, transaction information associated with payments made via a payment account for each of a plurality of members associated with a membership entity;
analyzing, by a computer processor of an analyzer platform, the retrieved transaction information to automatically determine periodic payment information associated with the payment account for each of the plurality of members;
outputting the automatically determined periodic payment information to facilitate display of a graphical user interface, the graphical user interface including:
an account identifier for each of the plurality of members,
proximate to each account identifier, an indication of confidence level reflecting how likely it is that the associated member was accurately determined by the analyzing as being associated with a periodic payment, and
a user selectable search input which, in response to being selected by the user, automatically adjusts the plurality of account identifiers included in the display of the graphical user interface based on a type of periodic payment information specified in the user selectable search input;
automatically predicting, based on the determined periodic payment information and not based on any indication received from the membership entity, one or more future expiring events for corresponding one or more members of the plurality of members;

transmitting electronic records to an external email server or workflow management system to provide renewal notices of the one or more future expiring events to the corresponding one or more members; and storing a description of the predicted one or more future expiring events in a periodic payment database along with an associated predicted next periodic payment due date.

2. The method of claim 1, wherein the periodic payment information is associated with at least one of: (i) a subscription, (ii) a membership, (iii) a product, and (iv) a service.

3. The method of claim 1, wherein the payment account is associated with at least one of: (i) a credit card account, (ii) a debit card account, (iii) a bank account, and (iv) a pre-paid card account.

4. The method of claim 1, wherein the transaction information comprises at least one of: (i) an account identifier, (ii) a merchant identifier, (iii) a date, (iv) a time of day, (v) a payment amount, and (vi) a payment description.

5. The method of claim 1, wherein the periodic payment information is associated with at least one of: (i) predicted periodic payment information for an owner of the payment account, (ii) periodic payment information for the owner's household, and (iii) periodic payment information for the owner's business.

6. The method of claim 1, wherein the periodic payment information is determined based at least in part on a merchant category associated with payment transactions.

7. The method of claim 1, wherein said analyzing comprises:

establishing a payment time period; and searching for a series of payment transactions occurring over time, each payment transaction being separated from the next payment transaction in the series by approximately the payment time period.

8. The method of claim 7, wherein said searching is performed for a plurality of different payment time periods.

9. The method of claim 7, wherein each payment transaction in the series is for approximately the same payment amount.

10. The method of claim 7, further comprising:

calculating a predicted next periodic payment due data based on the series of payment transactions.

11. The method of claim 1, further comprising:

automatically identifying relevant factors in the transaction database using a predictive model generator; and outputting a predictive model using the relevant factors, wherein said automatically predicting is performed by executing the predictive model.

12. The method of claim 1, wherein each of the one or more expiring events is associated with one or more of: a subscription, a membership, a product, and a service.

13. A non-transitory, computer-readable medium having stored therein instructions that, upon execution, cause a computer processor to perform a method, the method comprising:

retrieving, from a transaction database, transaction information associated with payments made via a payment account for each of a plurality of members associated with a membership entity;

analyzing, by a computer processor of an analyzer platform, the retrieved transaction information to automatically determine periodic payment information associated with the payment account for each of the plurality of members;

outputting the automatically determined periodic payment information to facilitate display of a graphical user interface, the graphical user interface including:

an account identifier for each of the plurality of members, proximate to each account identifier, an indication of confidence level reflecting how likely it is that the associated member was accurately determined by the analyzing as being associated with a periodic payment, and a user selectable search input which, in response to being selected by the user, automatically adjusts the plurality of account identifiers included in the display of the graphical user interface based on a type of periodic payment information specified in the user selectable search input;

predicting, based on the determined periodic payment information and not based on any indication received from the membership entity, one or more future expiring events for corresponding one or more members of the plurality of members;

transmitting electronic records to an external email server or workflow management system to provide renewal notices of the one or more future expiring events to the corresponding one or more members; and storing a description of the predicted one or more future expiring events in a periodic payment database along with an associated predicted next periodic payment due date.

14. The medium of claim 13, wherein the periodic payment information is associated with at least one of: (i) a subscription, (ii) a membership, (iii) a product, and (iv) a service.

15. The medium of claim 14, further comprising:

calculating a predicted next periodic payment due data based on the series of payment transactions.

16. The medium of claim 13, wherein said analyzing comprises:

establishing a payment time period; and searching for a series of payment transactions occurring over time, each payment transaction being separated from the next payment transaction in the series by approximately the payment time period.

17. An apparatus, comprising:

a transaction database storing transaction information associated with payments made via a payment account for each of a plurality of members associated with a membership entity; and a periodic payment platform to: (i) retrieve transaction information from the transaction database for each of the plurality of members, (ii) analyze the retrieved transaction information to determine periodic payment information associated with the payment account for each of the plurality of members, and (iii) output the automatically determined periodic payment information to facilitate display of a graphical user interface, the graphical user interface including:

an account identifier for each of the plurality of members, proximate to each account identifier, an indication of confidence level reflecting how likely it is that the associated member was accurately determined by the analyzing as being associated with a periodic payment, and a user selectable search input which, in response to being selected by the user, automatically adjusts the plurality of account identifiers included in the display of the graphical user interface based on a type of periodic payment information specified in the user selectable search input;

a predictive model generator, configured to predict, based on the determined periodic payment information and not based on any indication received from the membership entity, one or more future expiring events for corresponding one or more members of the plurality of members; and a periodic payment database to receive, from the periodic payment platform, and store a description of the predicted one or more future expiring events along with an associated predicted next periodic payment due date, wherein the periodic payment platform is further to transmit electronic records to an external email server or workflow management system to provide renewal notices of the one or more future expiring events to the corresponding one or more members.

18. The apparatus of claim 17, wherein the periodic payment information is associated with at least one of: (i) a subscription, (ii) a membership, (iii) a product, and (iv) a service.

19. The apparatus of claim 17, wherein said analyzing performed by the periodic payment platform comprises:

establishing a payment time period; and searching for a series of payment transactions occurring over time, each payment transaction being separated from the next payment transaction in the series by approximately the payment time period.

20. The apparatus of claim 19, wherein the periodic payment platform is further to calculate a predicted next periodic payment due data based on the series of payment transactions.

* * * * *